US011281014B2

United States Patent
Hughes et al.

(10) Patent No.: US 11,281,014 B2
(45) Date of Patent: Mar. 22, 2022

(54) HEAD-MOUNTABLE DISPLAY DEVICE AND METHOD

(71) Applicant: Sony Interactive Entertainment Inc., Tokyo (JP)

(72) Inventors: Colin Jonathan Hughes, London (GB); Oliver Hume, London (GB); Patrick John Connor, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 147 days.

(21) Appl. No.: 16/432,016

(22) Filed: Jun. 5, 2019

(65) Prior Publication Data

US 2019/0377191 A1  Dec. 12, 2019

(30) Foreign Application Priority Data

Jun. 8, 2018  (GB) .................................... 1809451

(51) Int. Cl.
*G02B 27/01* (2006.01)
*G06K 9/00* (2022.01)

(52) U.S. Cl.
CPC ..... *G02B 27/0176* (2013.01); *G02B 27/0101* (2013.01); *G02B 27/0149* (2013.01);
(Continued)

(58) Field of Classification Search
CPC ..... G01B 17/00; G01S 15/89; G02B 27/0093; G02B 27/0101; G02B 27/0149;
(Continued)

(56) References Cited

U.S. PATENT DOCUMENTS

| 10,558,895 | B2 * | 2/2020 | Linden ................... G06F 3/013 |
| 2008/0130950 | A1 * | 6/2008 | Miklos ................... G06F 3/013 |
| | | | 382/103 |

(Continued)

FOREIGN PATENT DOCUMENTS

| WO | 9424940 A | 11/1994 |
| WO | 2016149416 A1 | 9/2016 |

OTHER PUBLICATIONS

Search and Examination Report for corresponding GB Application No. GB1809451.6, 3 pages, dated Nov. 30, 2018.

(Continued)

*Primary Examiner* — Stacy Khoo
(74) *Attorney, Agent, or Firm* — Matthew B. Dernier, Esq.

(57) ABSTRACT

A head-mountable display device includes: a display element observable by a user; an image generator operable to generate an image for display by the display element; a plurality of ultrasound transducers, the ultrasound transducers being operable and arranged to emit ultrasound signals towards at least a first eye of the user when the head-mountable display is being worn by the user; one or more sensors operable and arranged to detect reflections of the emitted ultrasound signals; an eye imaging unit operable to generate a representation of the user's eye based on the ultrasound signals received at the one or more sensors; and an eye position detector configured to detect the position of the eye relative to the position of the head-mountable display device based on the representation, the eye position detector being configured to detect whether the position of the eye is offset from a desired position.

26 Claims, 9 Drawing Sheets

(52) U.S. Cl.
CPC ..... *G02B 27/0172* (2013.01); *G06K 9/00604* (2013.01); *G02B 2027/0136* (2013.01); *G02B 2027/0161* (2013.01); *G02B 2027/0178* (2013.01)

(58) Field of Classification Search
CPC .............. G02B 27/017; G02B 27/0172; G02B 27/0176; G02B 2027/0136; G02B 2027/0161; G02B 2027/0178; G02B 2027/0181; G02B 2027/0187; G06F 3/013; G06K 9/00604; G06K 9/00617
See application file for complete search history.

(56) References Cited

U.S. PATENT DOCUMENTS

| | | | |
|---|---|---|---|
| 2014/0375541 A1* | 12/2014 | Nister | A61B 3/113 345/156 |
| 2015/0049012 A1* | 2/2015 | Liu | G06F 3/017 345/156 |
| 2017/0080255 A1* | 3/2017 | Law | B06B 1/0622 |
| 2017/0102767 A1* | 4/2017 | Kim | G02B 27/017 |
| 2017/0261610 A1 | 9/2017 | Scally | |
| 2018/0161579 A1* | 6/2018 | Franke | A61B 5/1127 |
| 2019/0041643 A1* | 2/2019 | Chang | H04N 13/344 |
| 2019/0175954 A1* | 6/2019 | Levy | G01S 15/8925 |

OTHER PUBLICATIONS

Examination Report for corresponding GB Application No. GB1809451.6, 3 pages, dated Oct. 22, 2020.

\* cited by examiner

HEAD-MOUNTABLE DISPLAY DEVICE AND METHOD

BACKGROUND OF THE INVENTION

Field of the Invention

The present disclosure relates to a head-mountable display device and a method of determining whether a head-mountable display is being worn correctly by a user.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Head-mountable displays (HMDs) allow users to experience immersive content by displaying images as part of a virtual, augmented or mixed reality. However, a user's experience of this content will be sub-optimal if the HMD is not being worn correctly by the user. For example, images displayed at the HMD may appear less clear or distorted if the user's eyes are not properly aligned with one or more optical elements within the HMD. Moreover, the displayed image may need adjusting depending on e.g. the interpupillary distance (IPD) of the user's eyes and/or the eye-relief of the HMD.

In some known HMDs, pupil-tracking is used to determine whether a user is wearing an HMD in the correct position. Typically, this involves capturing images of the user's eyes with a camera and using computer vision or machine learning to detect the position of the pupils within the captured images. However, there is a problem with these techniques in that the pupils of the user's eyes may not always fall within the camera's field of view. In such a case, it may not be possible to determine how the user should adjust the HMD. This is because there will be no reference position from which an adjustment to the position of the HMD can be determined. Moreover, the presence of e.g. contact lenses or glasses, may limit the accuracy with which the position of the user's pupils can be tracked.

The present invention seeks to mitigate or at least alleviate these problems. In doing so, the present invention provides a more accurate and fail-proof means through which the position of the HMD relative to the position of the wearer's eyes can be determined. This allows a user to more easily correct the manner in which they are wearing the HMD, and in turn, optimize their visual experience of the content being displayed.

SUMMARY OF THE INVENTION

According to a first aspect disclosed herein, there is provided a head-mountable display device in accordance with claim 1.

According to a another aspect disclosed herein, there is provided a method of determining whether a head-mountable display is being worn correctly, in accordance with claim 18.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
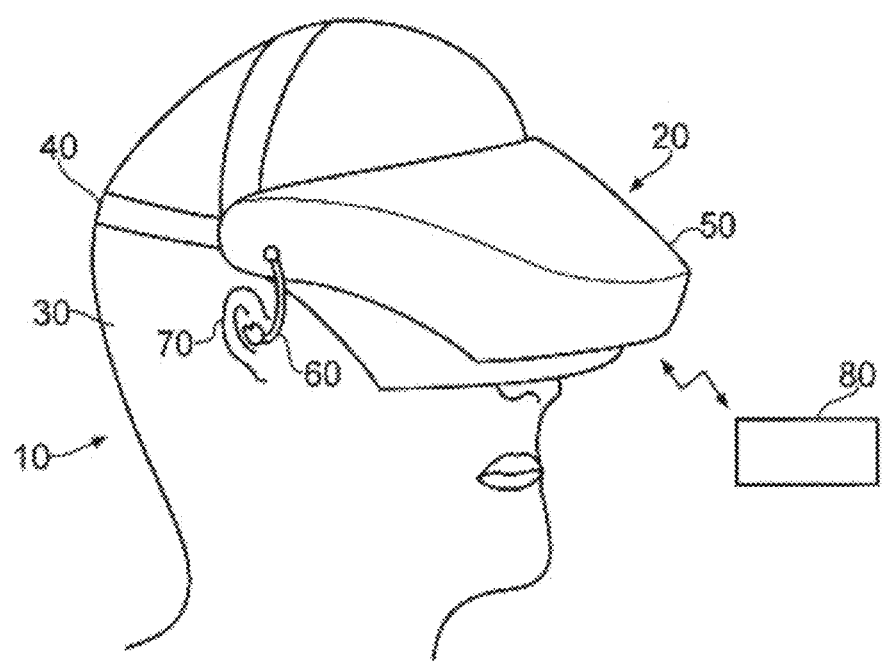
FIG. 1 shows schematically an HMD worn by a user.

Referring now to the drawings, wherein like reference numerals designate identical or corresponding parts throughout the several views, FIG. 1 shows a schematically a user 10 wearing an HMD 20 on the user's head 30. The HMD comprises a frame 40, in this example formed of a rear strap and a top strap, and a display portion 50. The HMD shown in FIG. 1 corresponds to a known HMD, i.e. a HMD having the components shown is known in the art.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer. The display element may be, for example, an active-matrix organic light-emitting diode (AMOLED) display, or, for example, a micro LED display.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. In the example of FIG. 1, a separate respective display is provided for each of the user's eyes.

Figure 2:
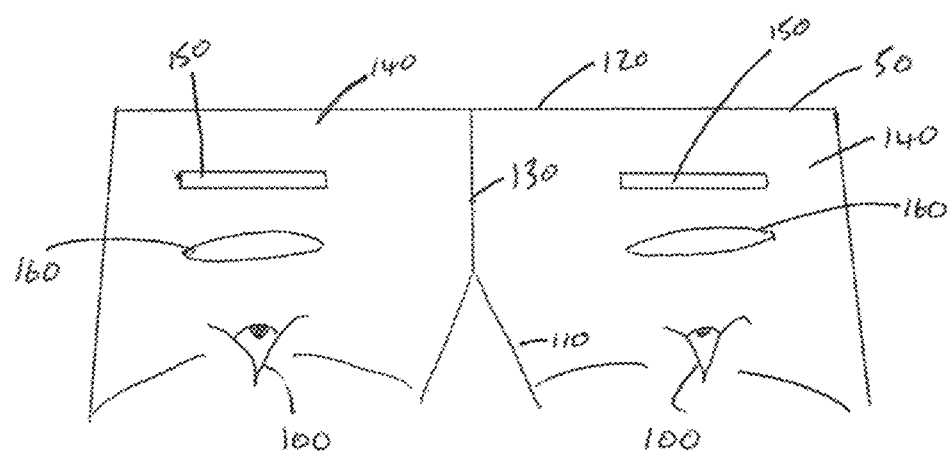
FIG. 2 shows schematically a plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
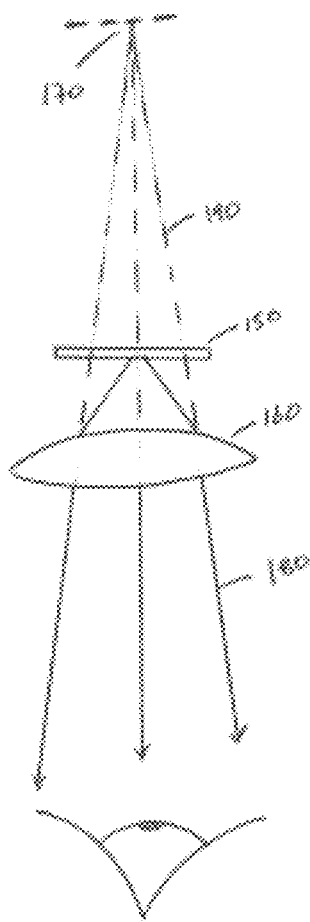
FIG. 3 shows schematically the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150.

As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
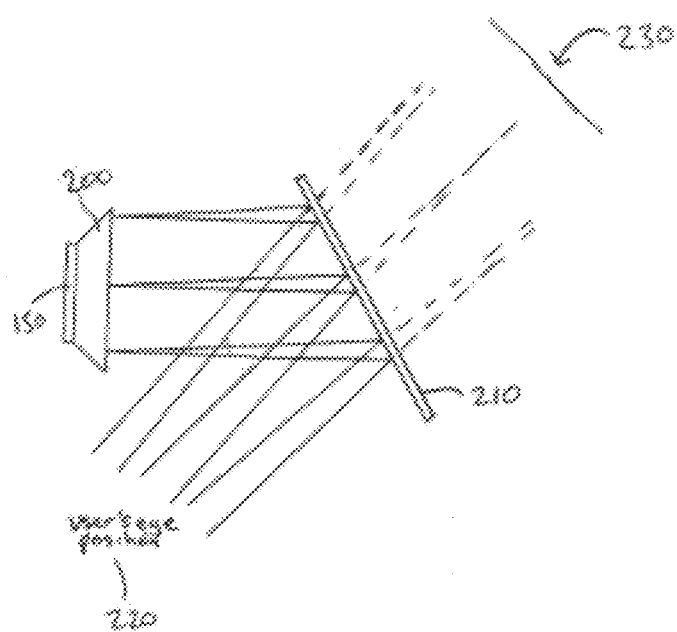
FIG. 4 shows schematically another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

In the case where separate respective displays are provided for each of the user's eyes, it is possible to display stereoscopic images. The images will exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Figure 5:
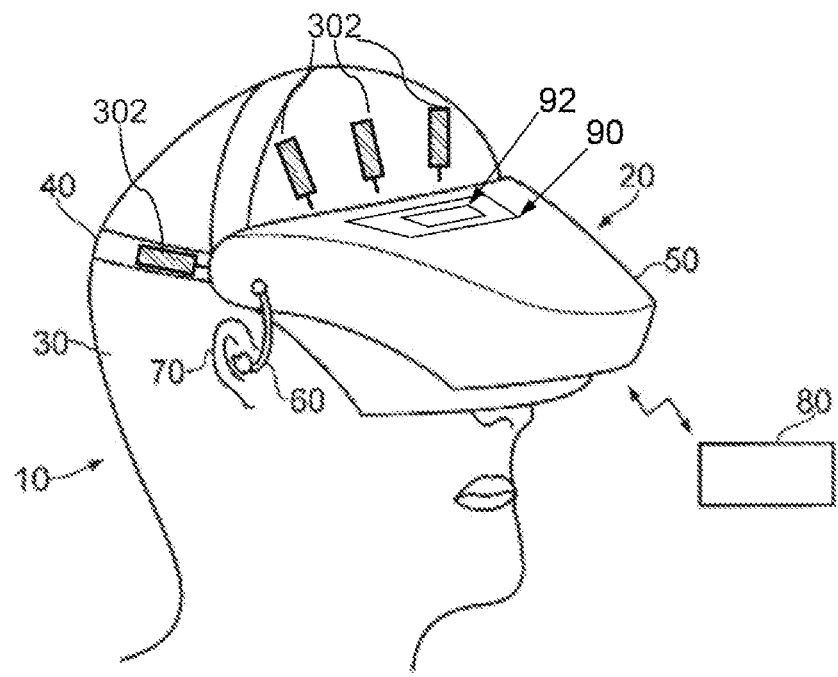
FIG. 5 shows schematically an HMD in accordance with the present invention.

FIG. 5 shows schematically an example of a HMD 20 in accordance with an embodiment of the present invention. The HMD 20 corresponds to the HMDs described previously, but with the addition of a plurality of ultrasound transducers 302. These ultrasound transducers 302 are used to detect the position of the user's eyes 100 relative to the HMD 20, as will be described below.

The ultrasound transducers 302 are configured to emit ultrasound signals via their respective antennas or emitters. Generally, this involves using a beamforming oscillator to generate an electronic signal consisting of pulses of sine waves oscillating at an ultrasonic frequency. The electronic signal is provided to the ultrasound transducers 302 which convert the electronic signal into ultrasound signals (i.e. ultrasonic signals). These ultrasound signals can then be transmitted through the surface of a material, such as through the surface of a user's skin, into the underlying tissue.

The HMD 20 also comprises a sensor for detecting reflections of the ultrasound signals emitted by the ultrasound transducers 302. In some embodiments, the ultrasound transducers 302 act as the sensors. That is, the ultrasound transducers 302 may be configured to both emit ultrasound signals and to receive reflections thereof. The reflections of the ultrasound signals can be used to generate an image of the user's eye 100, as will be described below.

In some examples, the ultrasound transducers 302 may comprise microelectromechanical system (MEMs) devices. For example, the ultrasound transducers 302 may be capacitive micro-machined ultrasonic transducers (CMUTs).

In preferred embodiments, the ultrasound transducers 302 are used as part of a phased array probe. That is, the ultrasound transducers 302 are arranged in an array, and a controller is used to control the time or phasing at which each respective ultrasound transducer 302 emits a pulsed ultrasound signal. In these embodiments, the ultrasound transducers 302 can be pulsed independently. By varying the timing, e.g. by pulsing the transducers 302 one by one in sequence along a row, or adjusting the relative phase of a continuous signal such as a sinusoidal signal between transducers, a pattern of constructive interference is set up that results in a beam travelling in a specific direction relative to the array. In this way, the beam can be focussed and steered electronically.

In the present invention, the phased array probe may be used to sweep the beam across a region of the user's skull that includes at least one of the user's eyes 100. Reflections of this beam are received at the sensor and used to generate a volumetric image of the region through which the beam was swept. The generation of this volumetric image may consist of capturing multiple 2D ultrasound images (each corresponding to a slice through the scanned region) and combining these so as to form the 3D image (or equally any suitable representation of the combined data, even if not formatted as an image). The generation of the 3D image may be performed by an eye imaging unit 90 (see FIG. 5), which is configured to receive and process the reflections received at the sensor.

Figure 6:
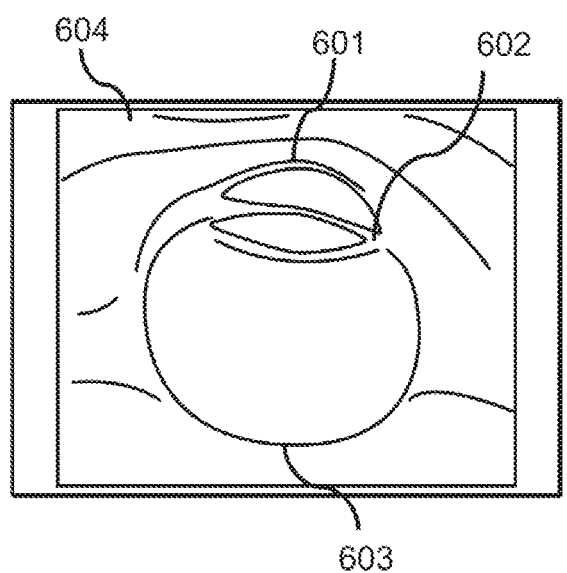
FIG. 6 shows schematically an example of a 2D ultrasound image captured by an eye imaging unit.

An example of a 2D ultrasound image is shown in FIG. 6, which shows a top-down view of the user's eye 100. The structures corresponding to the cornea 601, pupil 602, vitreous body 603 and surrounding tissue 604 of the user's eye 100 are visible in the 2D ultrasound image. The image may correspond, for example, to a slice of the user's eye 100 at a particular depth from the array of ultrasound transducers. By capturing a plurality of these images, each at a different depth from the phased array probe, the 3D image can be generated. This 3D image can then be used to determine the position of the user's eye 100 in three dimensions relative to the transducers.

It is worth noting that the generation of a 3D image, as opposed to a 2D image, is advantageous. For example, if a 2D image is used to determine the distance to e.g. a surface of the user's eye 100, then it is more likely that this image will be distorted by the user's eye lids, eye lashes, hair etc. As a result, a position of the user's eye 100 determined from this image is more likely to be inaccurate. This is less of a problem for the present invention since distortion in one of the 2D images is unlikely to propagate through the rest of the 2D images making up the volumetric image. With a 3D image, it is also more likely that more of the features of the eye will be in the captured image, and therefore the position of the user's eye can be determined more accurately. This differs from a 2D image where only some of the features of the user's eye may be visible and therefore a position of the user's eye inferred from this may lack accuracy.

Taking the image in FIG. 6 to occupy an X-Y plane, then it will be appreciated that the resolution of the image in the Z plane may be lower than in the X-Y plane.

In some examples, there may be two phased array probes located within the HMD 20, each being arranged and operable to scan a different one of the user's eyes 100. In other examples, there may be a single phased array probe operable and arranged to scan both of the user's eyes 100, or, as noted above, just one eye.

In other embodiments, the ultrasound transducers 302 may not be part of a phased array probe. For example, each ultrasound transducer 302 may be operable to emit its respective ultrasound signal at the same time, and the direction of a resultant beam may be controlled by way of one or more waveguides located within the HMD 20 (i.e. in the optical path between the ultrasound transducers and the user's eyes 100). In some examples, the waveguides may be controllable so as to control the direction of the beam resulting from the superposition of ultrasound signals. This may involve, for example, controlling movement of the waveguides, using e.g. microelectromechanical systems (MEMs) to which the waveguides are attached.

In FIG. 5, the four ultrasound transducers 302 are shown as being located at various positions around the HMD 20. Three of the transducers are shown as being located above the display portion 50. This may be achieved, for example, by embedding the transducers 302 within a pad that rests against the top of the user's head (i.e. a top or upper portion of the user's head, such as within a region above the eyebrows to the crown, and more specifically against the forehead, and possibly across the hairline) when the HMD 20 is being worn by the user. The pad may be made of a relatively soft material and may act so as to provide comfort to the user. The pad may also distribute the weight of the HMD 20 over a larger area of the user's head, so as to not place an undue strain on the front of the user's face. The three transducers 302 may form part of a phased array probe, as described above.

Figure 7:
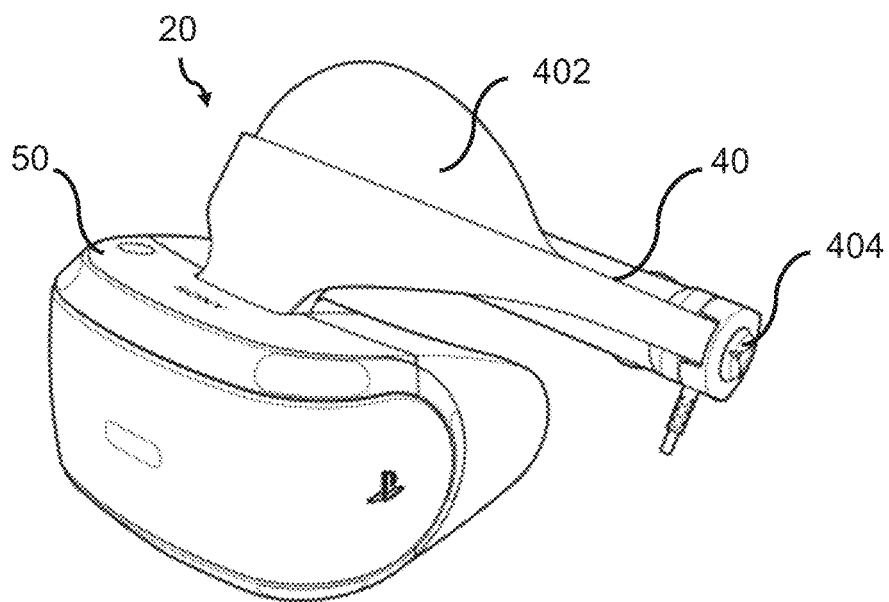
FIG. 7 shows schematically a view of a PS VR headset.

An example of such a pad is shown in FIG. 7, which shows schematically an example of an HMD 20 in the form of a PlayStation™ VR headset. As can be seen in FIG. 7, the HMD 20 includes a pad 402 that is secured to the frame 40, and is positioned so as to rest against the top of the user's head and/or forehead when the headset is being worn by the user. The ultrasound transducers may be positioned within this pad, and arranged so as to emit ultrasound signals in a direction of the user's eye(s) 100.

In some examples, the pad may allow direct contact between the ultrasound transducers and the user's head. For example, the bottom surface of the pad may have a plurality of slits that expose the skin on the surface of the user's head to the antennae of the ultrasound transducers. This direct contact may lessen the amount of attenuation occurring as a result of an air gap between the pad and the user's head. It may also reduce the amount of attenuation occurring as a result of ultrasound signals being reflected at the skull boundary. Generally, the spacing between the pad and the user's head should be kept as small as is practically possible so as to limit this attenuation from occurring. In any event, either by direct contact or via material of the pad, the ultrasound transducers can be acoustically coupled to the user.

The mounting of some or all of the ultrasound transducers within such a pad may be particularly advantageous for the reasons given above, and because the pad and frame have a curved shape that corresponds to the curvature of the user's head, providing repeatable and secure placement of the ultrasound transducers. By contrast, placing the transducers within the display portion of the HMD, or in a goggle-like housing thereof, may result in greater variability in ultrasound sensing due to less firm contact between the display portion and the user's face (for example to prevent fogging, or to accommodate glasses), and also due to a greater variability in facial structure. However it will be appreciated that the use of ultrasound transducers within the display portion that can be acoustically coupled to the user through facial contact areas of the display portion may nevertheless be considered.

Meanwhile, for HMD devices that use alternative support arrangements, such as elasticated side straps that hold the display unit under tension onto the user's face, then mounting of some or all of the ultrasound transducers within contact areas of the display unit will still enable use of the techniques described herein.

In FIG. 7, the HMD 20 is also shown as having an adjustor 404 that enables the user to adjust the frame so as to fit round the user's head.

Returning to FIG. 5, it can be seen that the HMD 20 optionally also includes an ultrasound transducer 302 positioned within the frame of the HMD 20. In the figure shown, this transducer 302 is located at a position behind the user's right ear and is oriented so as to emit ultrasound signals in the direction of the user's eye 100. This may provide an additional or alternative view of the user's eye 100, from which an ultrasound image can be captured. In some embodiments, a plurality of transducers may be located at this position as part of an additional phased array probe. As noted above, such a transducer may alternatively or in addition be optionally included within a facial contact area of the display unit.

It will be appreciated that, whilst four ultrasound transducers are shown in FIG. 5, a different number to this may be employed in the HMD 20. In some examples, there may be no ultrasound transducer located in the frame or the display unit of the HMD 20. In additional or alternative examples, there may more than or fewer than three ultrasound transducers located above the display portion 50, such as in the pad 402. Ultimately, the number of ultrasound transducers used, as well as their positions within the HMD 20, will depend on the desired view of the user's eyes 100, and the desired resolution of an image that is to be captured of the user's eyes 100.

Figure 8:
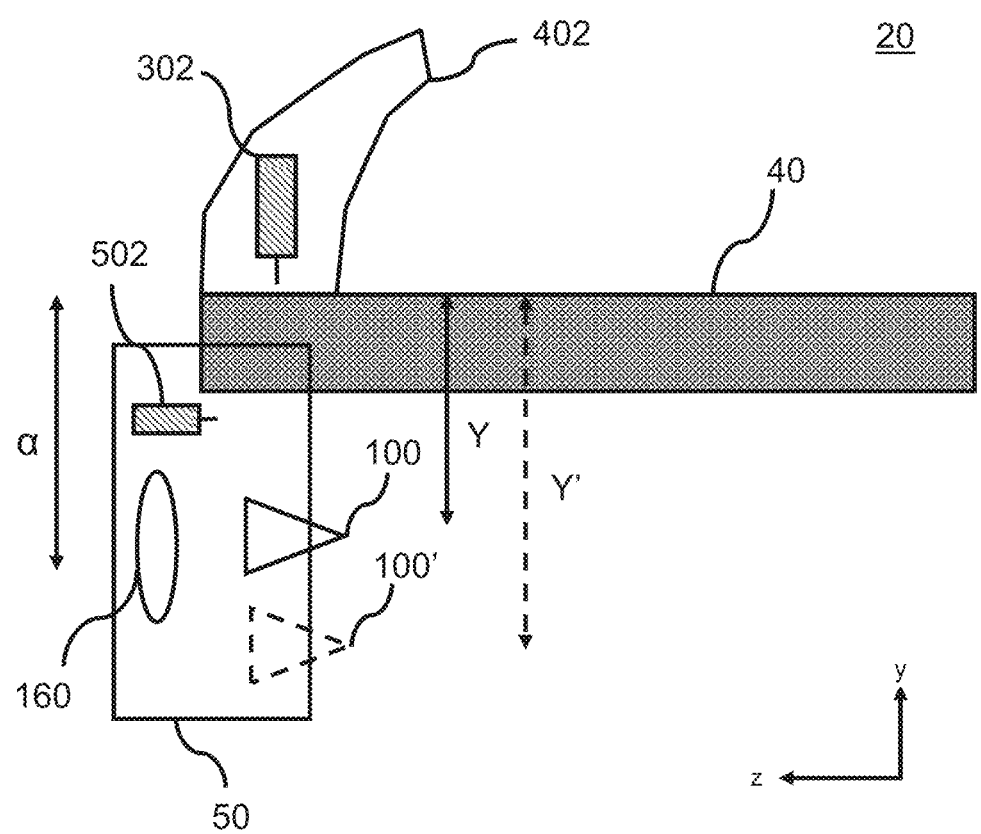
FIG. 8 shows schematically a side view of an HMD in accordance with the present invention.

FIG. 8 shows a side view of an HMD 20 in accordance with the present invention. As can be seen in the Figure, the HMD 20 includes a frame 40, a display portion 50, an optical element 160, a pad 402 and one or more transducers 302 as described previously. In FIG. 8, the HMD 20 is positioned on the user's head such that a display element 150 (not shown) is viewable by the user's eyes 100. In preferred embodiments a plurality of ultrasound transducers 302 are used forming a phased array probe.

In some embodiments, the distance of the display portion 50 from the user's face may be controllable. For example, the HMD 20 may comprise an adjustable scope (not shown) that allows the user to control the distance of the display portion 50 from the user's eyes 100. The scope may be adjustable by way of a scope adjust button (not shown) located at e.g. the underside of the display portion 50. By holding the scope adjust button and pushing the display portion 50 towards or away from their face, the user can control the distance of the display portion 50 from their eyes 100. This may be useful where, for example, the user is wearing glasses and wishes to fit the HMD 20 over their glasses. In FIG. 8, this corresponds to moving the HMD 20 in the z-axis.

In these embodiments, i.e. where the HMD 20 has an adjustable scope, it may be desirable to include one or more ultrasound transducers 302 within the display portion 50. This is shown in FIG. 8, where it can be seen that an ultrasound transducer 502 is located within the HMD 20, and is arranged so as to be emit ultrasound signals in the direction of the user's eye(s) 100. In these embodiments, the ultrasound transducer 502 may be used to determine how far the display portion 50 has been extended away from or towards the user's face. This may be useful, for example, in determining the eye 100 relief of the HMD 20, which may need to be taken into account when rendering an image at the HMD 20.

In the example shown in FIG. 8, the user's eyes 100 are shown as being at a first position (in solid line) and at a second position (in dashed line), relative to the position of the HMD 20. The first position corresponds to a position of the user's eyes 100 relative to the HMD 20, when the HMD 20 is being worn correctly by the user. The second position corresponds to a position of the user's eyes 100 when the HMD 20 is not being worn correctly by the user. The second position generally corresponds to an undesirable position of the HMD 20 relative to the user's eyes 100. The display element 150 of the HMD 20 may still be visible to the user when their eyes 100 are at the second position. However, the image when viewed from this position may appear sub-optimal, e.g. appearing less clear, distorted, obstructed, etc. This may be due to e.g. chromatic aberration.

To address this problem, the HMD 20 of the present invention employs an eye position detector for detecting the position of the user's eyes 100 relative to the position of the HMD 20 (when it is being worn on the user's head).

The eye position detector is configured to detect the position of the user's eyes 100 based on the volumetric image generated by the eye imaging unit. As described previously, the volumetric image may be generated by capturing and combining a plurality of 2D ultrasound images of the user's eye 100. Each 2D image may correspond to a successive slice of the user's eye 100, with each slice being located at a different distance from the ultrasound transducer. By detecting the regions within these images that correspond to the user's eye 100, a volume enclosing the user's eye 100 can be determined. From this, the position of the user's eye 100 in three-dimensions relative to the ultrasound transducer (and therefore, HMD 20) can be determined.

In some examples, the eye position detector may be configured to detect a position of the user's cornea/pupil within the volumetric image generated by the eye imaging unit. The distance of the user's cornea/pupil from the sensor(s) may be compared against a pre-determined distance that corresponds to an expected distance of the cornea/pupil, when the HMD 20 is being worn correctly by the user. Again, if there is discrepancy between these two distances, the user may be instructed to adjust the HMD 20 accordingly. As will be appreciated, the ability to detect the user's cornea/pupil within the volumetric image will ultimately depend on the resolution(s) of the image.

In FIG. 8, the user's eyes 100 are shown as being located at a vertical distance Y from the ultrasound transducer, when the HMD 20 is being worn correctly by the user. In this example, the distance Y corresponds to the distance $\alpha$, where $\alpha$ corresponds to the vertical distance that would be expected when the user is wearing the HMD 20 correctly. In some examples, $\alpha$ may be considered as a pre-determined constant, or a pre-determined range that the value of Y should fall within. If the difference between Y and $\alpha$ exceeds a threshold difference then it may be said that the HMD 20 is being worn incorrectly. An example of this is shown in FIG. 8, where it can be seen that the distance to the user's eyes at the second position, Y', deviates from the distance $\alpha$.

In FIG. 8, the distance $\alpha$ corresponds to the distance between an ultrasound transducer 302 (such as one mounted above the display unit) and the centre of the lens 160 within the HMD 20, when the HMD 20 is being worn correctly by the user. This is because, in general, it is desirable that the user is viewing a displayed image through the centre of the lens 160. It is from this position that a displayed image will appear most clear to the user (i.e. the lens will focus the image on to the user's retina). Hence, in some embodiments, the eye position detector may be configured to determine whether the position of the user's eye 100 corresponds to the user looking at the centre of the lens 160. This may involve for example, comparing the determined position of the user's eye 100 (or specifically, the cornea/pupil) with a predetermined position corresponding to the centre of a lens 160 within the HMD 20. In some examples, this may be performed separately for each eye 100, i.e. where there is a lens 160 for each eye 100.

It will be appreciated that, whilst the above example has been described in terms of comparing vertical distances, the comparison may be based on distances in more than one dimension. For example, in most cases it is unlikely that the ultrasound transducer 302 (or phased array probe) will be pointed completely vertically downwards. Moreover, in some examples, the orientation of the display portion 50 relative to the frame may be adjustable. Hence, the distance from the ultrasound transducer and centre of the optical element may be variable. In such a case, it may necessary to monitor an orientation of the display portion 50, and to factor this in when determining an appropriate predetermined distance against which the position of the cornea/pupil should be compared.

Figure 9:
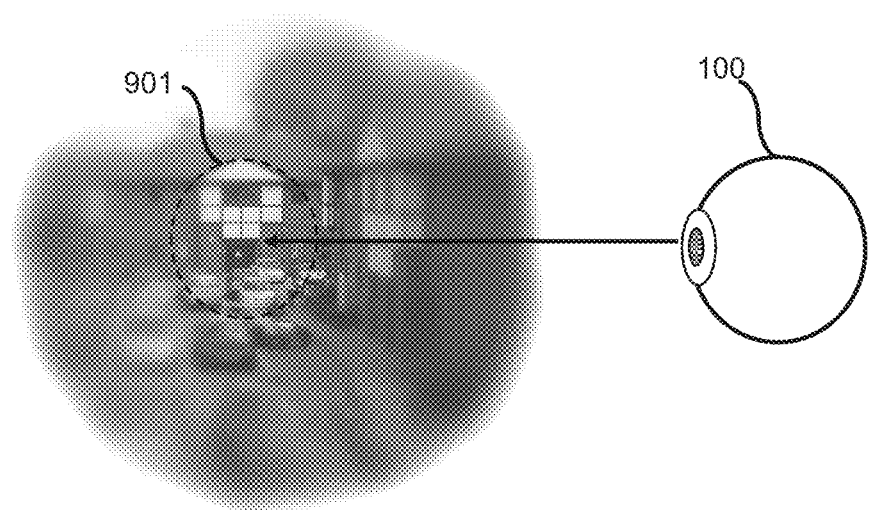
FIG. 9 shows schematically an example of an image generated via a foveated rendering technique.

In some embodiments, the HMD 20 may generate images using a foveated rendering technique. As is known in the art, this generally involves tracking the pupils of the user's eyes 100 and reducing the image quality in the user's peripheral vision (which the user is unlikely to notice). An example of an image rendered using foveated rendering is shown in FIG. 9. As can be seen in the Figure, the region 901 of the image gazed by the fovea (within the dashed circle) is displayed with a higher resolution than the rest of the image. As the gaze-direction of the user changes, the region 901 of the image displayed at the higher resolution is updated accordingly.

In order to employ foveated rendering, the HMD 20 may employ a gaze-direction detector for tracking the pupils of the user's eyes 100. The HMD 20 may employ a gaze-direction detector for each eye 100, or a single gaze-direction detector for both eyes 100.

The gaze-direction detector may comprise a camera, such as an infra-red camera, for capturing images of the user's eye(s) 100. The gaze-direction detector may also comprise one or more infra-red light sources, such as infra-red LEDs, for illuminating the user's eyes 100. The infra-red LEDs may be operable to emit relatively high intensity infra-red light, and the infra-red camera may be arranged so as to detect any specular reflections of the light (so called 'glints') off of the user's cornea. The gaze-direction detector may further employ a hot mirror for directing the reflected infra-red light to the infra-red camera. As is known in the art, hot mirrors reflect infra-red light whilst allowing visible light to pass through them. Hence the hot mirror can be positioned in front of the user's eyes 100 without obscuring the user's view of the image displayed at the HMD 20. The position of the user's pupil within the captured images may be detected using machine learning or computer vision techniques, as is known in the art.

It will be appreciated that the gaze-direction detector described above is just one example of a known gaze-direction detector and that other types of gaze-direction detector may be employed by the present invention.

Figure 10:
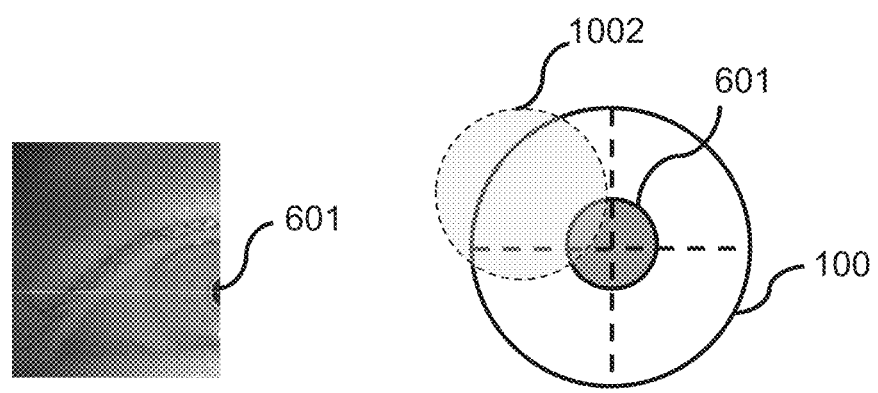
FIG. 10 shows schematically an image captured by a camera of a gaze-direction detector and a field of view of a gaze-direction detector.

FIG. 10 shows schematically an example of an image captured by the camera of the gaze-direction detector. The image on the left corresponds to an image captured by a camera of the gaze-direction detector. The image on the right shows schematically the field of view 1002 of the camera of the gaze-direction detector and where the user's eye falls within this.

In the example shown in FIG. 10, the pupil 601 of the user's eye 100 is only partially within the field of view 1002 of the camera. In such a case, it may be difficult to track the direction of the user's gaze. If, for example, the pupil 601 of the user's eye 100 is not detectable by the gaze direction detector then the gaze-tracking is likely to fail. In such a situation, it may not be possible to determine how the HMD 20 should be re-positioned (or how to implement any foveated rendering), since there will be no reference position from which to determine a relative adjustment.

However, this misalignment between the user's pupils and the camera of the gaze-direction detector will not interfere with the eye imaging unit's ability to generate a volumetric image/representation of the user's eye 100 from ultrasound, nor with the eye position detector's ability to determine a position of the user's eye 100 from the volumetric image. Hence, should the user's pupil 601 fall outside of the camera's field of view 1002, the position of the user's eye 100 can still be determined. This can then be used to determine how the position of the HMD 20 should be re-adjusted on the user's head. Once the HMD 20 has been re-adjusted in this way, the pupils 601 of the user's eye 100 should fall within the camera's field of view 1002. Thus the gaze-tracking and any foveated image rendering can continue to be performed.

In some examples, the gaze direction detector may be configured to control the position and/or orientation of one or more components within the gaze-direction detector, based on the position of the user's eye 100 detected by the eye position detector. This may involve, for example, adjusting the position and/or orientation of the camera, so as to point towards a position where the user's eye 100 (or eyes 100) is determined to be. In further examples, this may also involve controlling the position and/or orientation of the hot mirror and/or infra-red light sources, based on the determined position of the user's eye 100. Generally, the position and/or orientation of these components may be adjusted so as to enable the gaze-direction of the user's eye 100 to be tracked.

It should be noted that, in some embodiments, the HMD 20 need not employ a gaze-direction detector at all. For example, the gaze-tracking may be performed using solely the eye position detector of the present invention. The eye position detector may be configured to detect the position of the pupil/cornea of the user's eye 100 from the volumetric image. From this, the gaze-direction of the user may be determined. In these embodiments, the image displayed at the HMD 20 may be adjusted, based on the position of the user's pupils determined by the eye position detector. For example, foveated image rendering may be employed, but based on the position of the user's pupils detected by the eye position detector and not by a separate gaze-direction detector located within the HMD 20. Hence in these embodiments, gaze-tracking can be performed without the need for additional light sources and sensors. This is advantageous in that it allows both the position of the HMD 20 on the user's head to be monitored, as well as the gaze-direction of the user, without the need for an excessive number of components. In this case, optionally the eye position detector may track the state of the or each user's eye for a single depth (i.e. one 2D slice) at a high frequency, whilst generating the volumetric image/representation at a lower frequency, or intermittently (e.g. when the user blinks or their eye moves by more than a threshold amount, and/or by more than a threshold speed). In this way, the position of the cornea and its relative size (corresponding to what part of it intersects the 2D plane at the given depth from the sensors) can be used to determine the gaze direction with a high frequency, making the system responsive, whilst the lower frequency volumetric image provides re-calibration of the eye position (which could change for example due to a small shift of the HMD on the user's head) and the ability to compare the 2D slice with the most recent volumetric image. For example, the system could alternate between capturing the same 2D slice and incremental slices that build the volumetric representation.

In some embodiments, the HMD 20 may further comprise an interpupillary distance (IPD) detector 92 (see FIG. 5) configured to determine the interpupillary distance of the user's eyes 100. This may involve, for example, determining the position of the user's pupils 601 in the volumetric image of the user's eyes 100 (or in each image, where these images are generated separately for each eye 100). A distance between the two pupils 601 may then be determined and used to determine an IPD of the user's eyes 100. The IPD detector may be configured to perform this analysis by processing the images generated by the eye imaging unit, for example.

In some examples, the image displayed at the HMD 20 may be adjusted so as to take into account the IPD determined by the IPD detector. The HMD 20 includes an image generator operable to generate images for display at a display element 150, or display elements, of the HMD 20. The image generator may be configured to receive an input from the IPD detector and to modify the image for display at the display element(s) 150. This may involve, for example, altering a distortion correction that is to be applied to the image(s) for display at the HMD 20.

In some examples, the display element(s) 150 may have a controllable position within the HMD 20. The position of the display element (s) may be controlled based on the IPD detected by the IPD detector. As will be appreciated this movement of the display element(s) 150 may be limited so as to not interfere with e.g. the stereoscopic image that is to be displayed at the HMD 20.

In some embodiments, the eye position detector is configured to determine the eye relief of the HMD 20, based on the determined position of the user's eye(s) 100. The eye relief defines the distance from the last surface of an eye piece within the HMD 20 within which the user's eye 100 can obtain a full viewing angle of the displayed image. In the example shown in FIG. 8, this may correspond to the distance between the user's eye 100 and the lens 160 through which the image displayed at the HMD 20 is made viewable.

As described previously, the HMD 20 may employ an ultrasound transducer 502 located in front of the user's eyes 100. This ultrasound transducer 502 may be used to generate a three-dimensional image of the user's eye 100, but captured from a head-on view. The position of the user's eye 100 relative to this ultrasound transducer 502 may be used to determine the eye relief of the HMD 20 (i.e. the distance between the lens of the head-mounted display and the user's cornea that allows the user to obtain a full viewing angle). It is generally desirable to know the eye relief of the HMD 20, since this will affect the user's view of the image that is displayed at the HMD 20. For example, it may be necessary to alter a distortion correction that is applied to the displayed image, based on the determined eye relief.

In some examples, the position of the user's eye 100 determined via the ultrasound transducer 502 may be used to determine whether the eye relief of the HMD 20 corresponds to a desired eye relief. For example, the gaze-tracking described previously may be prone to failure if the eye relief deviates from a desired eye relief. An example of this is shown in FIGS. 11A and 11B.

Figure 11A:
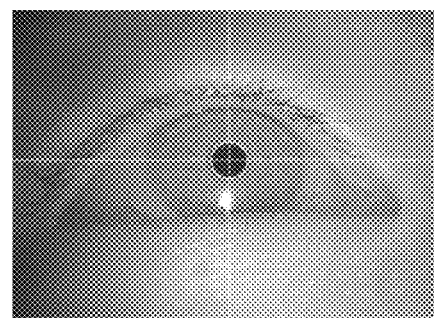
FIGS. 11A and 11B show an example of unwanted reflections that may appear in an image captured by the camera of a gaze-direction detector.
Figure 11B:
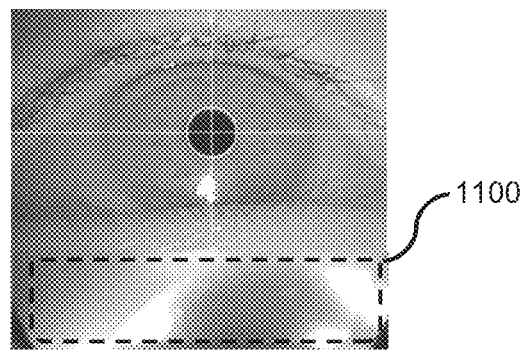

FIG. 11A shows an example of an image captured by the camera of the gaze-direction detector, when the eye relief of the HMD 20 is an acceptable value. FIG. 11B shows an example of an image captured by the camera when the eye relief is less than a desired value. In FIG. 11B, it can be seen that undesired reflections 1100 are visible in the captured image. These reflections 1100 may be from the one or more light sources (i.e. LEDs) used in the gaze-direction detector. The presence of these reflections in the captured image can interfere with the tracking of the user's pupil. For example, the regions of high light intensity may be mistaken as corresponding to 'glints', when in fact they do not coincide with the position of the user's cornea/pupil.

The present invention is able to overcome this problem by using the eye position detector to determine whether the position of the user's eye(s) 100 corresponds with a desired eye relief. Since the eye position detector relies on ultrasound, and not visible or infra-red light, reflections of the kind shown in FIG. 11B should not interfere with the method of eye-position detection.

Hence more generally, the eye position detector is configured to detect whether the position of the eye is offset from a desired position.

If the position of the user's eyes 100 is determined as not corresponding with a desired eye relief, the user can then be instructed to re-position the HMD 20 accordingly.

In some embodiments, the user may be instructed to re-position the HMD 20 based on an audio signal generated by an audio signal generator. The audio signal generator may be configured to receive an input from the eye position detector, and based thereon, to generate an audio signal for outputting by one or more speakers of the HMD 20. The audio signal may correspond to, for example, a speech signal in which the user is directed verbally to adjust the HMD 20 in a particular direction. In some examples, the audio signal may simply be a simple tone and the volume and/or periodicity with which the signal is output may be adjusted so as to reflect how close or far the HMD 20 is from being worn correctly. For example, the tone may be output more frequently as the HMD 20 approaches a correct position.

In other examples, the audio signal may be output so as to originate from a direction in which the user needs to move the HMD 20 in. For example, if the user needs to pull the HMD 20 in a left to right direction, an audio signal may be output at a speaker that is located closer to the user's right ear than the user's left ear. In some examples, the audio output of two or more speakers may be controlled so as to generate a stereophonic signal that appears to originate from a direction that the user should move the HMD 20 in.

In some embodiments, the user may be instructed to re-position the HMD 20 visually, i.e. via an image displayed at the display element(s) 150 of the HMD 20. The image may include a visual indicator in the form of e.g. an animated arrow, directing the user as to a direction in which the HMD 20 should be re-positioned. The size, brightness and/or boldness of the arrow may be adjustable so as to indicate how far or close the user is from wearing the HMD 20 correctly. For example, if the user is required to re-position the HMD 20 by a large amount, this may be indicated by a larger or arrow. In some examples, the visual indicator may simply be a predetermined image, such as a target, from which the user can determine where their eye 100 is properly aligned with the display element(s) 150 of the HMD 20.

As will be appreciated, the user's ability to view the visual indicator will depend on how the HMD 20 is being worn by the user. Hence, in some embodiments, a combination of audio and visual outputs may be preferred for directing the user to re-position the HMD 20.

In some embodiments, the eye position detector may be configured to detect the position of the user's eye 100 periodically. The rate at which the position is detected may depend on when and how the HMD 20 is being used. For example, the position may be detected at a higher rate when the HMD 20 is initially turned on and less once the HMD 20 is detected as being worn correctly.

It will be appreciated that generating a volumetric image of the user's eye 100 may require a large amount of data to be captured and processed, and that this will need to be repeated each time the position of the user's eye 100 is to be detected. To address this problem, the eye imaging unit may be configured to generate low resolution volumetric images of the user's eye(s) 100. The eye position detector may employ, for example, a machine learning (ML) classifier trained to detect the position of eyes 100 in low resolution 3D images of eyes 100 (or portions of a skull that include one or both eyes 100). The ML classifier may be trained with previously captured low resolution 3D images, captured from the same view point as the ultrasound transducers of the HMD 20, for example.

The ML classifier may be used to determine the minimum amount of volumetric data that can be captured, from which the position of the user's eye 100 can accurately determined. Once this is known, the eye 100 imagining unit can be controlled so as to capture that amount of volumetric data, and the eye position detector can employ the trained ML classifier to determine the corresponding position of the user's eyes 100 relative to the HMD 20.

In additional or alternative embodiments, the amount of data required to generate the volumetric image may be minimized by ensuring that the beam emitted by the ultrasound transducers is directed solely to the orbit of the user's skull. This may be achieved by positioning the ultrasound transducers in the pad of the HMD 20, such that the antennae point in the direction of the orbit of the user's skull.

It will also be appreciated that the resolution of the volumetric image need not be uniform. For example, the gap between slices may be progressively larger above and below a calculated optical axis of the eye, based upon an initial volumetric image that may have a comparatively higher resolution. The X-Y resolution of the image may also be reduced with distance from the optical axis.

Variants embodiments of the present invention may use one or more of the ultrasound transducers, and/or 2D or 3D ultrasound images/representations obtained from them, for other purposes.

For example, the facial structure of each user of a particular HMD is likely to be different, due to age, gender and normal variability. A 2D slice or 3D volumetric image/representation of part of the user's facial structure (in particular, bone structure) could be used to recognise the user (e.g. classifying the facial structure as belonging to a registered user of the device, or identifying them as a guest user) for the purposes of selecting settings for the HMD or associated console, or for authentication (for example, preventing a younger sibling from playing an adult game on their other sibling's account). This facial structure would be very hard to fake, and would also be independent of surface features such as make-up, contact lenses, haircuts and the like.

It will be appreciated that the method and operations of the HMD described herein may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It should be noted that, whilst there are risks associated with the use of ultrasound—such as tissue heating or cavitation, the ultrasound transducers of the present invention would be controlled so as to stay well within the legal and medical limits associated with these risks. Generally, the signal strength of the ultrasound signals emitted by the ultrasound transducers would be controlled so as to not exceed safe signal strength.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A head-mountable display device comprising:
    a display element observable by a user;
    an image generator operable to generate an image for display by the display element;
    a plurality of ultrasound transducers, the ultrasound transducers being operable and arranged to emit ultrasound signals towards at least a first eye of the user when the head-mountable display is being worn by the user;
    one or more sensors operable and arranged to detect reflections of the emitted ultrasound signals;
    an eye imaging unit operable to generate a representation of the user's eye based on the ultrasound signals received at the one or more sensors;
    an eye position detector configured to detect the position of the eye relative to the position of the head-mountable display device based on the representation, the eye position detector being configured to detect whether the position of the eye is offset from a desired position; and
    a pad arranged to rest against, and in direct contact with, a top portion of the user's head when the head-mountable display device is being worn by the user; wherein one or more ultrasound transducers are located in the pad of the head-mountable display device.

2. The head-mountable display device according to claim 1, further comprising:
    a lens for focusing the image generated by the image generator onto the retina of the user's eye; wherein
    the eye position detector is configured to detect whether the eye is offset from the desired position by detecting whether the pupil of the eye is in alignment with the centre of the lens.

3. The head-mountable display device according to claim 1, wherein the eye position detector is configured to detect a gaze-direction of the user, based on the representation generated by the eye imaging unit.

4. The head-mountable display device according to claim 3,
wherein the image generator is configured to generate a foveated image; and
wherein the image generator is configured to determine a region of the image that is outside the zone gazed by the user's fovea, based on the detected gaze-direction.

5. The head-mountable display device according to claim 1,
wherein the head-mountable display device comprises a gaze-direction detector, the gaze direction detector comprising at least one of a camera, hot mirror and a plurality of light sources; and
wherein the gaze direction detector is operable to control an orientation of at least one of the camera, hot mirror and light sources, based on the position of the user's eye detected by the eye position detector.

6. The head-mountable display device according to claim 1, wherein at least some of the ultrasound transducers form part of a phased array probe.

7. The head-mountable display device according to claim 1, wherein the sensor comprises the ultrasound transducers.

8. The head-mountable display device according to claim 1, wherein the eye position detector is configured to determine the eye relief of the head-mountable display device, based on the position of the eye detected by the eye position detector.

9. The head-mountable display device according to claim 1,
wherein the eye imaging unit is operable to generate a representation of each of the user's eyes; and
wherein the head-mountable display device comprises an interpupillary distance detector configured to determine the interpupillary distance of the user's eyes based on the representations generated by the eye imaging unit.

10. The head-mountable display device according to claim 1, wherein the image generator is operable to modify an image for display based on the position of the eye detected by the eye position detector.

11. The head-mountable display device according to claim 1, further comprising a frame for affixing the head-mountable display device to the head of the user.

12. The head-mountable display device according to claim 11, wherein one or more ultrasound transducers are located in the frame of the head-mountable display device.

13. The head-mountable display device according to claim 11, further comprising:
a display portion secured to the frame; and
a scope adjustor for adjusting the distance of the display portion from an eye of the user when the head-mountable display device is being worn by the user;
wherein at least one of the ultrasound transducers is located within the display portion and is arranged so as to be located in front of the user's eye when the head-mountable display device is being worn by the user.

14. The head-mountable display device according to claim 1, comprising:
an audio signal generator operable to generate an audio signal based on the detected position of the user's eye, the audio signal indicating whether the user's eye is offset from the desired position; and
one or more speakers for outputting the generated audio signal.

15. The head-mountable display device according to claim 1, wherein the image generator is configured to generate a visual indication for display at the display element, the visual indicator indicating whether the position of the user's eye is offset from the desired position.

16. The head-mountable display device according to claim 1, wherein the eye imaging unit is operable to generate a low resolution representation of a portion of the user's skull that includes the user's eye; and
wherein the eye position detector comprises a machine learning classifier trained to determine the position of eyes within low resolution representations of eyes.

17. The head-mountable display device according to claim 1, wherein at least some of the ultrasound transducers are arranged so as to emit ultrasound signals towards the orbit of the user's skull.

18. A method of determining whether a head-mountable display is being worn correctly by a user, the method comprising:
emitting a plurality of ultrasound signals in the direction of at least a first eye of a user wearing the head-mountable display;
detecting reflections of the ultrasound signals at one or more sensors;
generating a representation of the user's eye based on the reflections of the ultrasound signals received at the one or more sensors;
determining the position of the eye relative to the position of the head-mountable display based on the representation; and
determining whether the position of the user's eye is offset from a desired position, the desired position corresponding to the position of the eye when the head-mountable display is being worn correctly; wherein
the head-mountable display includes a pad arranged to rest against, and in direct contact with, a top portion of the user's head when the head-mountable display is being worn by the user; and
the pad includes one or more ultrasound transducers.

19. The method according to claim 18, further comprising determining a gaze direction of the user, based on the generated representation; and
generating a foveated image based on the determined gaze direction of the user.

20. The method according to claim 18, wherein emitting a plurality of ultrasound signals in the direction of an eye of a user comprises controlling a time at which each ultrasound transducer of a phased array probe emits a respective pulsed ultrasound signal.

21. The method according to claim 18, further comprising determining an eye relief of the head mountable display based on the determined position of the user's eye relative to the head mountable display.

22. The method according to claim 18, further comprising outputting an audio signal at one or more speakers of the head-mountable display, if the position of the user's eye is detected as being offset from the desired position.

23. The method according to claim 18, wherein determining whether the position of the user's eye is offset from a desired position comprises determining whether the position of the user's eye corresponds to a position at which the pupil of the user's eye is aligned with a lens within the head mountable display.

24. The method according to claim 18, further comprising modifying an image displayed at the head-mountable display, based on the determined position of the user's eye relative to the head mountable display.

25. The method according to claim 18, further comprising training a machine learning algorithm to determine the position of a user's eye based on low resolution three-dimensional images of eyes;
  wherein generating the representation comprises generating a low resolution representation;
  wherein detecting the position of the user's eye relative to head mountable display comprises inputting the low resolution image to the trained machine learning algorithm.

26. A non-transitory, computer readable recording medium having computer executable instructions stored thereon, which when executed by a computer system, causes the computer system to determine whether a head-mountable display is being worn correctly by a user, by carrying out actions, comprising:
  emitting a plurality of ultrasound signals in the direction of at least a first eye of a user wearing the head-mountable display;
  detecting reflections of the ultrasound signals at one or more sensors;
  generating a representation of the user's eye based on the reflections of the ultrasound signals received at the one or more sensors;
  determining the position of the eye relative to the position of the head-mountable display based on the representation; and
  determining whether the position of the user's eye is offset from a desired position, the desired position corresponding to the position of the eye when the head-mountable display is being worn correctly; wherein
  the head-mountable display includes a pad arranged to rest against, and in direct contact with, a top portion of the user's head when the head-mountable display is being worn by the user; and
  the pad includes one or more ultrasound transducers.

* * * * *